UNITED STATES PATENT OFFICE.

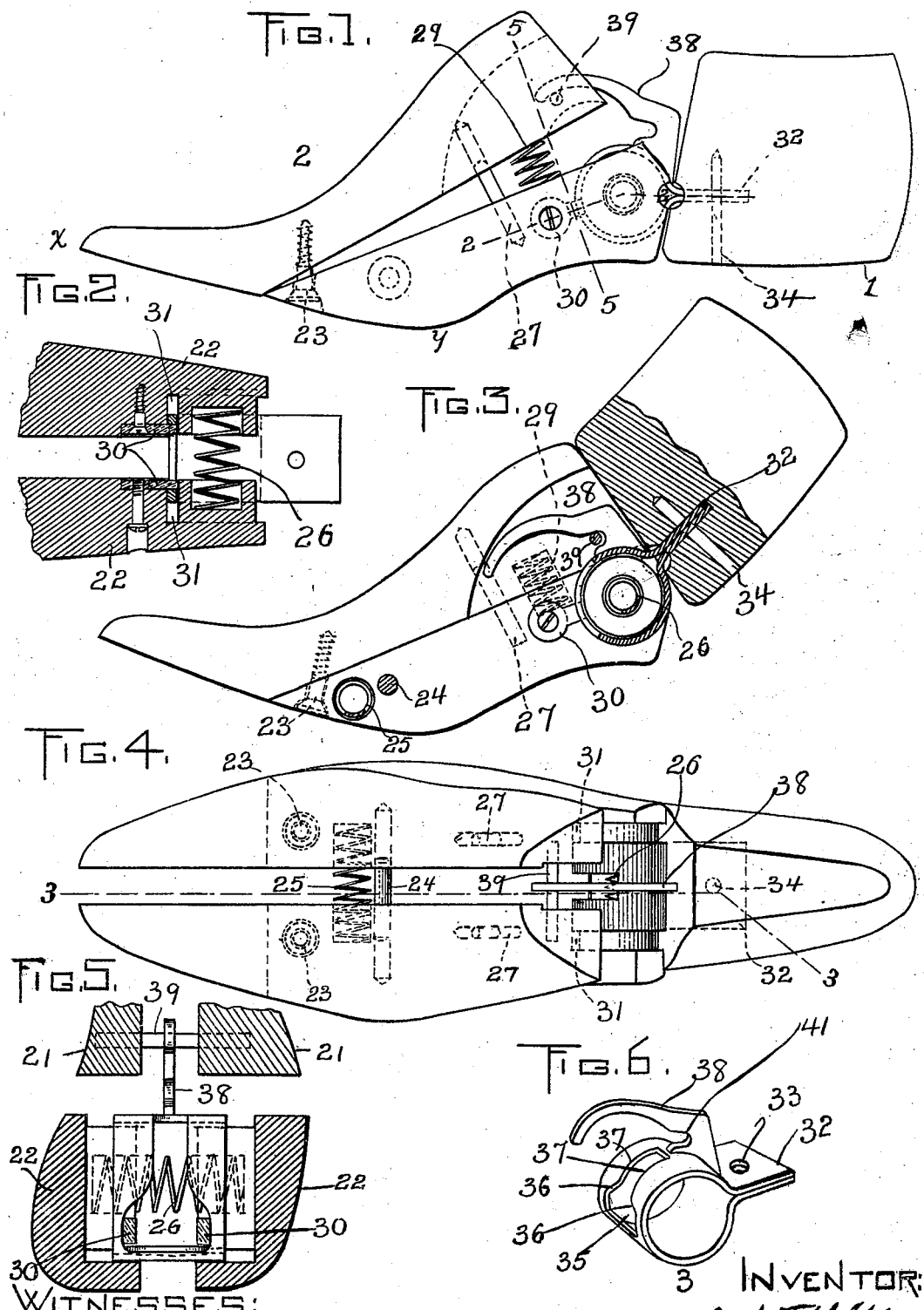

CHARLES ALBERT BATCHELDER, OF BROCKTON, MASSACHUSETTS, ASSIGNOR TO OLIVER A. MILLER, OF BROCKTON, MASSACHUSETTS.

HINGED SPLIT FOLLOWER.

SPECIFICATION forming part of Letters Patent No. 690,689, dated January 7, 1902.

Application filed January 30, 1900. Serial No. 3,328. (No model.)

*To all whom it may concern:*

Be it known that I, CHARLES ALBERT BATCHELDER, of Brockton, in the county of Plymouth and State of Massachusetts, have invented certain new and useful Improvements in Split Followers, of which the following is a specification.

This invention has for its object the production of a new and improved split follower; and it consists in the novel features of construction and relative arrangement of parts hereinafter fully described in the specification, clearly illustrated in the drawings, and particularly pointed out in the claims.

Figure 1 represents a side elevation of a hinged split follower constructed in accordance with my invention. Fig. 2 represents a cross longitudinal sectional view of the lower members of the fore part section on the line 2 2 of Fig. 1. Fig. 3 represents a section on line 3 3 of Fig. 4, showing the heel-section elevated. Fig. 4 represents a top plan view of the hinged split follower made in accordance with my invention. Fig. 5 represents a cross-sectional view on the line 5 5 of Fig. 1. Fig. 6 represents a detail perspective view of the hinge member.

The same characters of reference indicate the same parts in all of the figures.

The heel-section 1 and the multiple fore part 2 are connected by a hinge member 3. (See Fig. 6.) The multiple fore-part section 2 is composed of two upper members 21 21 and two lower members 22 22. The cut dividing the upper members from the lower members starts at the point above the location of the hinge member 3 and extends in an inclined plane to a point between the toe $x$ and the ball part $y$ of the fore-part section. (See Fig. 1.) Screws 23, having their heads arranged in sockets in sections 22, are secured to the sections 21, thereby holding the ends of the sections 21 in place, while permitting more or less play upon the screw-heads 23.

24 represents a pin having its ends arranged in the complemental recesses in the opposing faces of the members 22 to keep said members in alinement as they are slid toward and away from each other.

25 represents a coiled spring having its ends arranged in complemental recesses in the opposing faces of the members 22 and tending to force said members apart. The spring 25 is shown as arranged between the screws 23 and pin 24; but this particular location is not vital, the purpose being to have said spring act in conjunction with a spring 26, hereinafter mentioned, in order to force the sections 22 apart uniformly. The coiled spring 26, hereinafter referred to, has its ends arranged in complemental recesses in the opposing faces of the members 22 in their rear end. (See Figs. 2, 4, and 5.) A pin 27 is secured to the upper face of each of the members 22, and its free end is arranged in complemental recesses in each of the members 21 in order to keep the complemental members 21 and 22 in alinement, as they separate from each other in a vertical direction by means of springs 29, hereinafter described. The complemental sections 21 and 22 are forced apart by springs 29, having their ends arranged in complemental recesses in the opposing faces of the sections 21 22.

A cam-finger 30 is secured to the opposing faces of each of the members 22 near the rear end thereof and extending across slots 31, formed in the opposing faces in said members. (See Fig. 2.) The hinge member 3 may be made of any desired material; but it is preferred for cheapness and efficiency of the device to form the same of cheap metal, as shown in Fig. 6. The hinge being bent over upon itself to form a barrel having complemental ears 32, provided with an aperture 33, through which the pin 34 is passed to secure the hinge member in place, the ears 32 not only serve as means to anchor the hinge to the heel, but also to prevent the twisting of the hinge. The barrel part of the tube is formed with a recess 35, having cam-faces 36 and retaining-faces 37.

38 represents a cam-arm secured to the upper side of the hinge, as shown in Fig. 6, and arranged to engage a pin 39, whose ends are mounted in the opposing faces of the sections 21. The barrel part of the hinge is arranged in the recesses 31, with the fingers 30, when the follower is in the operative position, as shown in Fig. 1, arranged in recess 35. When the heel-section is drawn upward and forward, the cam-faces 36 engage the cam-fingers 30 and draw the sections 22 together. The motion of the sections 22 toward each other by means of the pin 27 also forces the sections 21 toward each other. While this operation is taking place, the cam-arm travels from the position shown in Fig. 1 to the position shown in Fig. 3. The cam-arm is provided with a holding-face 41. As the cam-arm travels from the position shown in Fig. 1 to the position shown in Fig. 3 it forces down the sections 21 upon the sections 22, and as the pin 39 engages the holding-face 41 the parts are locked in their closed position, as shown in Fig. 3, by the complemental action of the holding-faces 37, which keep the parts closed against each other in a lateral direction, while the holding-face 41 keeps the parts 21 forced down upon the parts 22.

Various modifications of my invention may be made without departing from the spirit and scope thereof, which comprises a multiple fore-part follower having means for automatically extending and for automatically closing and for automatically locking the parts in position.

While in the drawings I have shown a fore part divided by a vertical as well as horizontal cut, I wish to be understood as including within my invention a follower in which the fore part is divided only by a horizontal cut, since by my invention the follower will be contracted vertically by the upward movement of the heel, whether it be divided by a vertical cut or not.

Having thus explained the nature of my invention and described a way of constructing and using the same, though without attempting to set forth all the forms in which it is made or all the modes of its use, what I claim, and desire to secure by Letters Patent, is—

1. A hinged follower, comprising a heel-section, a sectional distensible fore part hinged to said section, and means for contracting the fore part laterally and vertically when the heel-section is swung upward.

2. A hinged follower, comprising a heel part, a sectional distensible fore part hinged to said heel part, means for simultaneously contracting the fore part laterally and vertically as the heel-section is thrown upward, the said means being arranged to lock the parts in a closed position.

3. A hinged follower, comprising a heel part, a divided fore part, and means for contracting the fore part in a vertical direction as the heel is swung upward, having provision for locking the fore part when it is contracted.

In testimony whereof I have affixed my signature in presence of two witnesses.

CHARLES ALBERT BATCHELDER.

Witnesses:
PETER W. PEZZETTI,
R. M. PIERSON.